(12) United States Patent
O'Brien

(10) Patent No.: US 6,332,332 B1
(45) Date of Patent: Dec. 25, 2001

(54) EVAPORATIVE AIR CONDITIONER

(76) Inventor: Timothy Frank O'Brien, 61 Malcolm Road, Braeside, Victoria 3195 (AU)

(*) Notice: Subject to any disclaimer, the term of this patent is extended or adjusted under 35 U.S.C. 154(b) by 0 days.

(21) Appl. No.: 09/381,071

(22) PCT Filed: Mar. 12, 1998

(86) PCT No.: PCT/AU98/00163

§ 371 Date: Mar. 24, 2000

§ 102(e) Date: Mar. 24, 2000

(87) PCT Pub. No.: WO98/40678

PCT Pub. Date: Sep. 17, 1998

(30) Foreign Application Priority Data

Mar. 12, 1997 (AU) .................................... PO5625

(51) Int. Cl.[7] ...................................... F28D 5/00

(52) U.S. Cl. ................................ 62/304; 62/314

(58) Field of Search ............................. 62/304, 314, 310, 62/DIG. 16, 315, 259.4

(56) References Cited

U.S. PATENT DOCUMENTS

| | | |
|---|---|---|
| D. 270,661 | 9/1983 | Pettengill . |
| 2,882,810 | 4/1959 | Goettl . |
| 4,132,087 | 1/1979 | Goettl . |
| 4,369,148 | 1/1983 | Hawkins . |
| 4,413,450 | 11/1983 | Brower . |
| 4,510,766 * | 4/1985 | Curtis, Sr. . |
| 4,573,490 * | 3/1986 | Kaletsky . |
| 4,658,600 | 4/1987 | Kelley . |
| 4,815,297 * | 3/1989 | Kelley . |
| 4,819,448 * | 4/1989 | Campbell et al. ................ 62/304 |
| 4,895,066 | 1/1990 | Carnahan . |
| 5,005,373 * | 4/1991 | East ................................ 62/304 X |
| 5,454,538 | 10/1995 | Merideth . |

FOREIGN PATENT DOCUMENTS

| | | |
|---|---|---|
| 19210/83 | 3/1984 | (AU) . |
| 14724/95 | 9/1995 | (AU) . |
| 17893 * | 11/1995 | (AU) . |
| 17893/95 | 11/1995 | (AU) . |

OTHER PUBLICATIONS

"Essick Evaporative Air Cooling Handbook," Austalia, 1967.
Handbook of Braemer Appliances, 3rd Ed., Australia, 1978.
Brochure, New? Jul–Air Round Fibreglass Evaporative Cooler (Essick Air Products Inc.), Austrilia, Jun. 1982.
Dr. John R. Watt, "Evaporative Air Conditioning Handbook," 3nd Ed., Australia, 1986.
Brochure,"Coolbreeze Natural Airconditioning," Australia, 1992.
Brochure, "On Hot Balmy Summer Days and Nights, Create Your Own Coolbreeze," Australia, 1992.
Brochure, "The Air Conditioning Book" Australia, Aug. 1992.
Brochure, "The Air Conditioning Book," 2nd Ed., Australia, Sep. 1993.

(List continued on next page.)

Primary Examiner—William Doerrler
Assistant Examiner—Chen-Wen Jiang
(74) Attorney, Agent, or Firm—Burns, Doane Swecker & Mathis

(57) ABSTRACT

A roof-mounted evaporative air conditioner is disclosed. The air conditioner includes a housing defined by a base which conforms to the pitch of the roof and includes an outlet for air to flow from the housing into ductwork; a plurality of vertical side walls having water absorbent panels that define an inlet for air to flow into the housing; and a top wall. The air conditioner further includes a water distribution system for supplying water to the panel(s) and a fan assembly for drawing air into the housing via the panel(s) so that the air is cooled by evaporating water in the panel(s).

30 Claims, 3 Drawing Sheets

OTHER PUBLICATIONS

Brochure, "The Air Conditioning Book," 3$^{rd}$ Ed., Australia, Jan. 1994.

Brochure, "The Air Conditioning Book: ES Series," Australia, 1996.

Brochure, "The Air Conditioning Book," for Breezair Australia, Sep. 1996.

Brochure, "The Air Conditioning Book," for Breezair Australia, Sep. 1996.

Flyer: "Fresh air conditioning that takes the heat off your budget," Jun. 1998.

Seeley International Evaporative Air Conditioning Manual, Breezair, Oct. 1991.

Flyer, "Is your productivity falling when the temperature rises?" Jun. 1998.

Brochure, "Cool Comfort Means Cool Profit," Jan. 1998.

Brochure, "Breezair—The High–Tech Evaporative Cooler" [publication date unknown].

Brochure, "Convair—the high–tech evaporative cooler" [publication date unknown].

Brochure, Breezair . . . the quiet performer . . . brings the cool breeze inside (2 verisions).

Brochure, "Breeze through summer in air–conditioned comfort—Breezair—Cooler by design" [publication date unknown].

Brochure, A Breath of Fresh Air: for Breezair, 1995.

Brochure, "Commercial Evaporative Air Conditioning," for Breezair, 1994.

Brochure, Simple, affordable Air Conditioning. Why pay for anything more, for Convair [publication date unknown].

Brochure, "Let's clear the air," for Convair [publication date unknown].

Brochure, "The freshness of a sea breeze through high–tech evaporative cooling" for Breezair [publication date unknown].

"Breezair Evaporative Airconditioners Specification Manual for Contractors, Architects, Engineers" [publication date unknown].

Booklet, spiralbound, "Examples of Breezair Installations World Wide" [publication date unknown].

Brochure, "The Cool Change you need for the Great Indoors," comprising Braemar Ducted Evaporative Air Conditioning Brochure [publication date unknown].

Brochure, "Enjoy the Endless Summer with Breezair fresh air conditioning" [publication date unknown].

Various Seeley International Pty Ltd technical data abstracts for various models, published in Nov. 1993, Feb. 1994, and Feb. 2000.

Various Seeley International Technical Data Specifications for EP series, published in Dec. 1993, Mar. 1994 and Jul. 1994.

Brochure, "We interrupt to bring you some high powered commercials,"for Breezair, Jan. 1994.

Brochure for Convair Side, Down and Top Discharge Evaporative Coolers (3 versions ) [publication date unknown].

Brochure, "We'll help increase your productivity—no sweat" for Breezair [publication date unknown].

Brochure, "Mieux Faits . . . Pour Etre Les Meilleurs!" comprising Convair Brochure published Dec. 1984.

Flyer, Tropic Proof—Seelectric Evaporative Cooler Motor.

Flyer, "The Best, The Proof" for Breezair [publication date unknown].

Flyer, "Breezair . . . outperforms the rest" [publication date unknown].

Flyer, "Air Conditioning—Industrial, Commercial and Residential Air Cooling" [publication date unknown].

Flyer, "Priced to go through the wall, not the roof" for Breezair Transit Wall or Window Mounted Air Conditioning, published Aug. 1996.

Flyer for Convair Transit air conditioners [publication date unknown].

Flyer for Breezair Window and Wall Mounted Evaporative Air Conditioners [publication date unknown].

Brochure, "Breezair—the new fresh air cooling system" [publication date unknown].

Flyer, "Ducted Whole Home Cooling. Simple, Affordable Comfort," Nov. 1993.

Bundle of Breezair evaporative cooler specifications.

Brochure, "Commercial Evaporative Air Conditioning" for Breezair products, Jan./Feb. 1996.

Specifications and information for the Breezair EA and ES Ranges, 1998.

Installation instructions for industrial evaporative air conditioners, Breezair, 1995.

\* cited by examiner

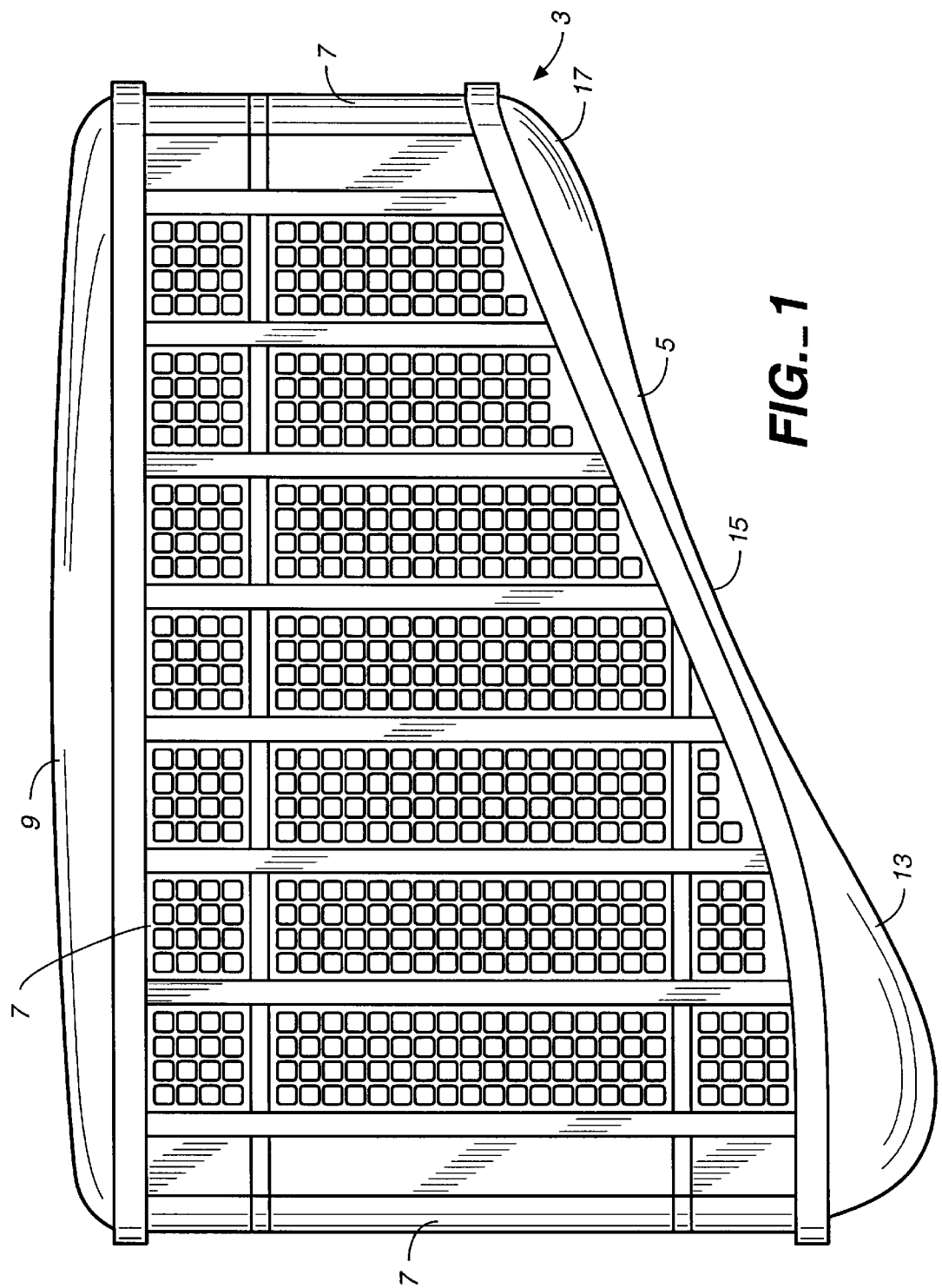
FIG._1

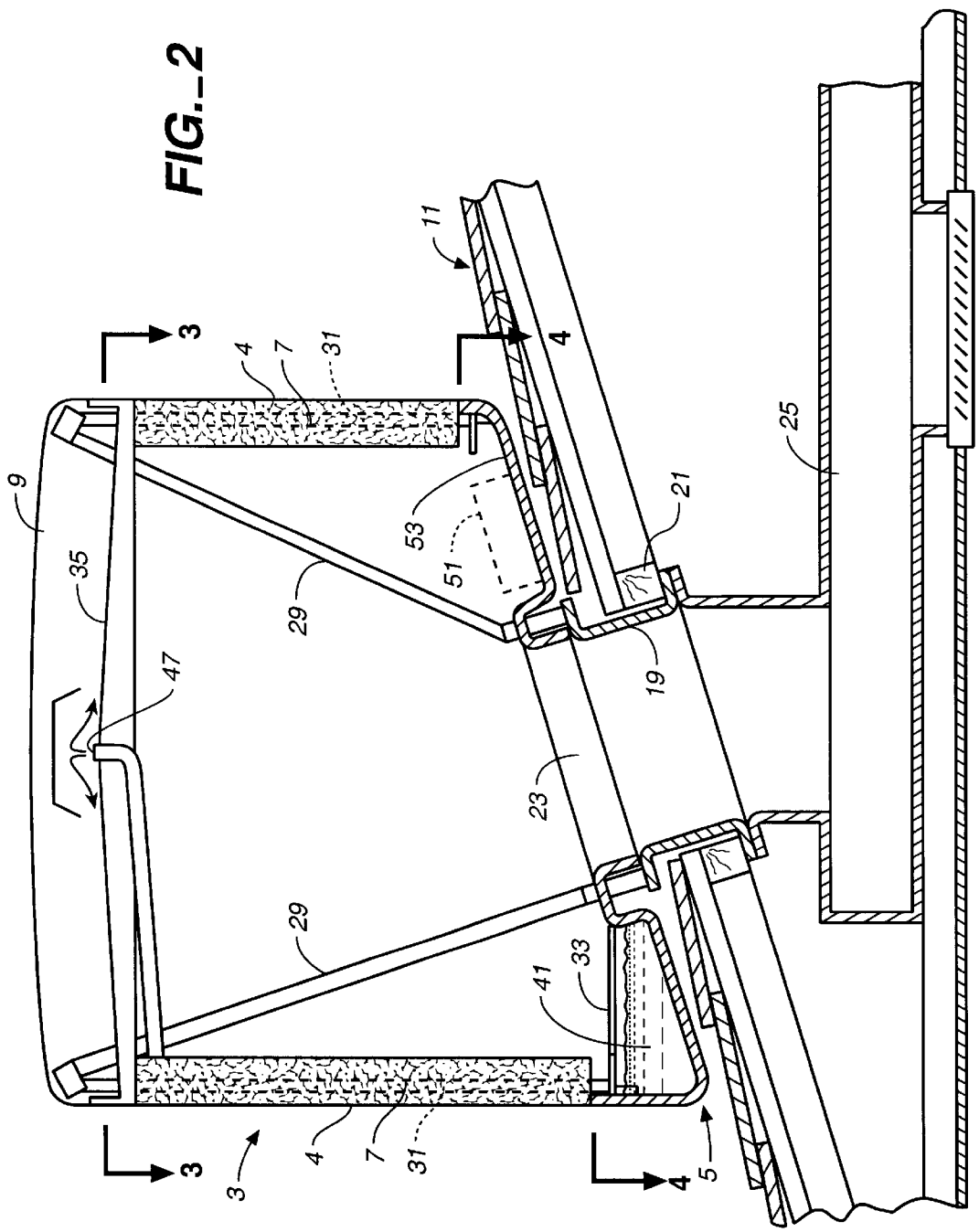

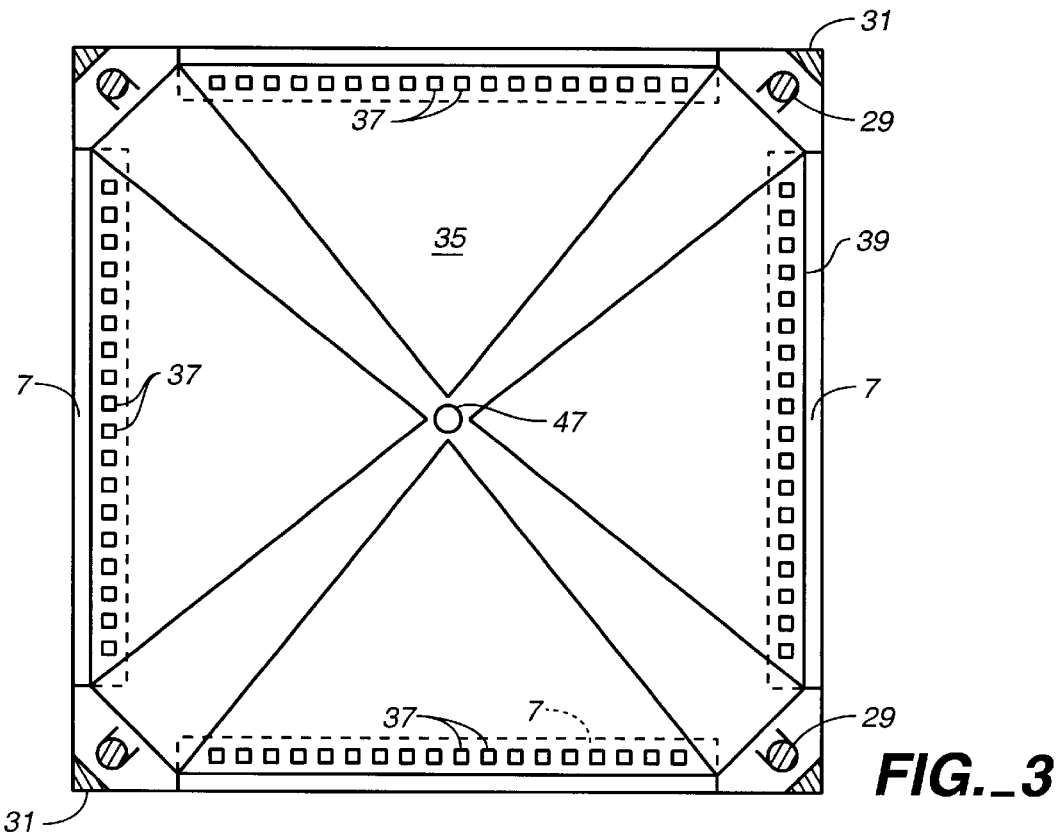
FIG._3
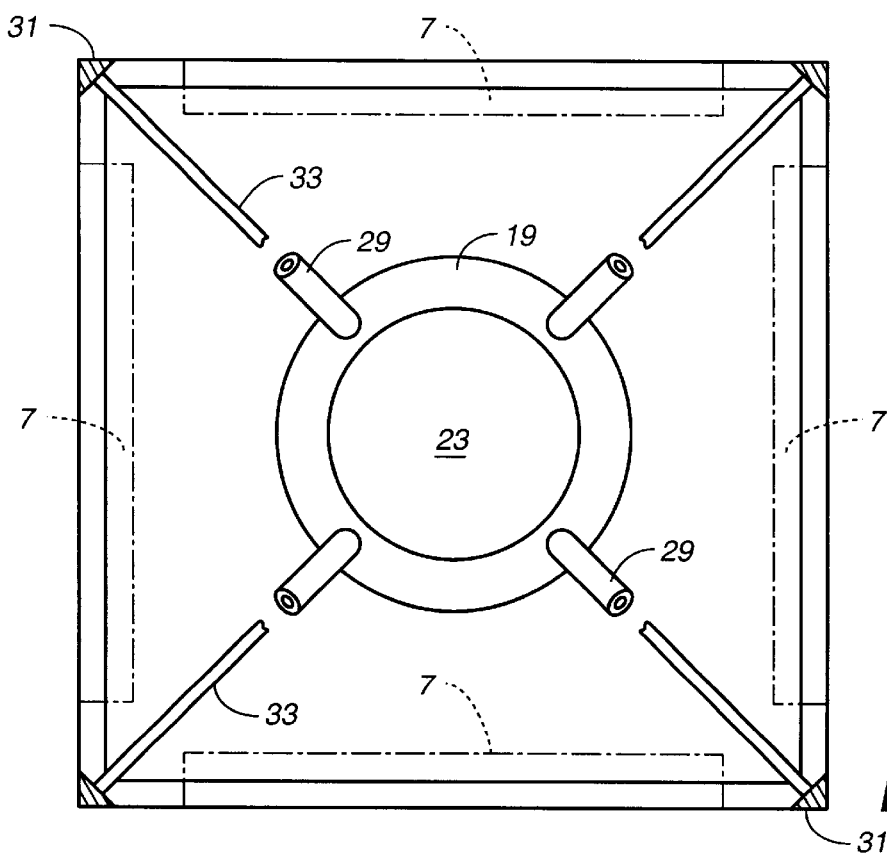
FIG._4

EVAPORATIVE AIR CONDITIONER

FIELD OF THE INVENTION

The present invention relates to an evaporative air conditioner.

BACKGROUND OF THE INVENTION AND BRIEF DESCRIPTION OF THE RELATED ART

The present invention relates particularly to an evaporative air conditioner that conforms to the roof-line of a house.

Conventional domestic air conditioners comprise:
(i) a housing defined by side walls, a base, and a top wall, with one or more of the side walls comprising water absorbent porous panels;
(ii) a water distribution system to supply water to the panels;
(iii) a fan for drawing air into the housing via the panels such that the air is cooled via heat exchange with water in the panels; and
(iv) an outlet for discharging cooled air from the housing into ductwork for distributing the cooled air.

Conventional domestic air conditioners are usually roof-mounted, with the housing being supported well above the roof-line by means of a hollow dropper tube which also defines part of the ductwork for supplying cooled air to a house. The positioning of the housing wall above the roof-line makes the conventional domestic air conditioners a prominent feature of houses that, in many instances, detracts from the overall appearance of houses and is an adverse factor on marketing of conventional air conditioners.

SUMMARY OF THE INVENTION

An object of the present invention is to provide a roof-mounted evaporative air conditioner which is not as prominent as conventional domestic roof-mounted air conditioners.

According to the present invention there is provided a roof-mounted evaporative air conditioner which includes:
(a) a housing defined by:
 (i) a base which conforms to the pitch of the roof and includes an outlet for air to flow from the housing into ductwork;
 (ii) a plurality of vertical side walls, with at least one side wall including a water absorbent panel that defines an inlet for air to flow into the housing; and
 (iii) a top wall;
(b) a water distribution system for supplying water to the panel(s); and
(c) a fan assembly for drawing air into the housing via the panel(s) so that the air is cooled by evaporating water in the panel(s).

The present invention is based on the realisation that forming an evaporative air conditioner having a housing with a base that conforms generally to the pitch of a roof and side walls that extend vertically when the air conditioner is mounted to the roof makes the air conditioner compatible with and not a prominent feature of the roof. In particular, the present invention makes it possible to minimize the spacing of the top wall of the housing above the roof.

It is preferred that the base be located on or a short distance only above the roof-line of the roof.

It is preferred that the top wall of the housing be generally horizontal.

It is preferred that the base include a generally wave-like configuration when viewed in side elevation, with a convex lower section, a concave middle section, and a convex upper section. The applicant has found that the wave-like configuration enables the base to match closely a range of different roof pitches.

It is preferred that the air conditioner includes a collar which is connected to the roof and defines a support for the housing and other components of the air conditioner and a transition between the outlet of the housing and the ductwork.

It is preferred particularly that the collar be mounted to the roof frame.

It is preferred particularly that the collar be at least substantially located below the roof-line.

It is preferred that the air conditioner includes a suspension system for suspending the housing and other components of the air conditioner in position above the roof-line.

It is preferred particularly that the suspension system be mounted to the collar.

It is preferred that the suspension system includes:
(i) a support arm extending upwardly from the collar to each upper corner section of the housing; and
(ii) a suspension member extending downwardly from the upper section of each corner and connected to the base.

It is preferred that the air conditioner further includes a brace element extending between the collar and the lower end of each suspension arm.

The applicant has found that positioning support members, suspension arms, and brace members to form a plurality of triangular assemblies results in a particularly effective support structure.

It is preferred that the water distribution system includes a water trough formed in a lower section of the base.

It is preferred that the water distribution system includes a water distribution tray positioned in an upper section of the housing and arranged to distribute water to the panel(s).

It is preferred that the water distribution system further include a means for pumping water from the water trough to the water distribution tray.

It is preferred that the water distribution system be adapted to supply different flow rates of water to each panel. This is an important feature in a situation where the air conditioner comprises panels in the upper and lower side walls of the housing so as to enable the water supply to the panels to be adjusted to take into account the different sizes of the panels.

According to the present invention there is also provided an evaporative air conditioner for mounting to a roof of a house, which air conditioner is characterised by a housing having a base which is adapted to conform to the pitch of the roof and a plurality of side walls adapted to extend vertically when the air conditioner is positioned on the roof, with at least one side wall including a water absorbent porous panel that defines an inlet for air to flow into the housing.

It is preferred that the housing further includes a top wall that is adapted to extend horizontally when the air conditioner is positioned on the roof.

It is preferred that the base includes a generally wave-like configuration when viewed in side elevation, with a convex lower section, a concave middle section, and a convex upper section.

It is preferred that the air conditioner further includes a water distribution system.

It is preferred particularly that the water distribution system includes:
(i) a water trough formed in a lower section of the base;
(ii) a water distribution tray positioned in a upper section of the housing for supplying water onto an upper edge of the panel(s); and (iii) a means for pumping water from the water trough to the water distribution tray.

It is preferred that the base include an outlet for air to flow from the housing into ductwork.

It is preferred that the air conditioner further includes a collar for supporting the housing and other components of the air conditioner which is adapted to be connected to the roof frame of the house and to define a transition between the outlet in the base and the ductwork.

It is preferred that the air conditioner further includes a fan for drawing into the housing via the side wall panel(s) and for discharging air from the housing via the outlet.

It is preferred that the fan be mounted to the collar.

BRIEF DESCRIPTION OF THE DRAWINGS

The present invention is described further by way of example with reference to the accompanying drawings of which:

FIG. 1 is a side elevation of a preferred embodiment of an evaporative air conditioner in accordance with the present invention;

FIG. 2 is a vertical section through the air conditioner;

FIG. 3 is a section along the line 3—3 in FIG. 2; and

FIG. 4 is a section along the line 4—4 in FIG. 2.

DETAILED DESCRIPTION OF THE PREFERRED EMBODIMENTS

The preferred embodiment of the evaporative air conditioner shown in the figures is mounted on a roof 11 of a house and is operable to supply cooled air via ductwork 25 to the rooms of the house.

With reference to the Figures, the evaporative air conditioner includes a housing, generally identified by the numeral 3, having a base 5, 4 side walls including water absorbent porous panels 7, and a top wall 9.

With particular reference to FIG. 2, the housing is constructed so that, in use, when the evaporative air conditioner is mounted on the roof 11, the base 5 conforms closely to the pitch of the roof 11, the side wall panels 7 extend vertically, and the top wall 9 extends horizontally. This construction of the housing 3 makes the evaporative air conditioner compatible with and not a prominent feature of the roof 11. In particular, unlike many conventional air conditioners that are mounted on dropper tubes that locate the air conditioners well above the roof-line, the air conditioner shown in the figures is located close to the roof-line.

With reference to FIG. 1, in order to accomodate a range of pitch variations, while maintaining compatibility of the air conditioner with the roof 11, the base 5 includes a wave-like configuration in side elevation, with a convex lower section 13, a concave middle section 15, and a convex upper section 17.

Whilst not an essential feature of the present invention, an important feature is that the structural components of the preferred embodiment of the air conditioner are located in or underneath the housing 3 so that the principal purpose of the visible exterior construction of the roof-mounted housing is to optimise the compatibility of the air conditioner and the roof 11.

With reference to FIG. 2, the air conditioner includes a collar 19 located underneath the base 5 that is connected by bolts (not shown) or other suitable means to the roof 11, and more particularly to the roof frame 21, and defines a support for the housing 3 and the other components of the air conditioner.

The base 5 of the housing 3 is formed with an opening 23 which defines an outlet for cooled air from the housing 3. The collar 19 is aligned with and forms an extension of the outlet opening 23 and provides a mounting surface for the ductwork 25 so that, in use, cooled air from the housing 3 flows via the outlet opening 23 and the collar 19 into the ductwork 25 and, thereafter, is distributed to the rooms of the house.

The air conditioner further includes a water distribution system for distributing water to the side wall panels 7.

The water distribution system includes a water distribution tray 35 mounted in an upper section of the housing 3. With particular reference to FIG. 3, the tray 35 has a central opening 47 which defines an inlet for supplying water to the tray 35. Furthermore, the tray 35 has a slightly downwardly sloping surface over which, in use, water flows towards the periphery of the tray 35. The tray 35 further includes an upwardly extending wall 39 at the periphery of the tray 35 and a series of water outlets 37 inboard of the wall 39. The outlet openings 37 are positioned so that, in use, water from the inlet opening 47 flows through the outlet opening 37 onto the upper surface of the side wall panels 7.

The water distribution system further includes a water trough 41 in the lower section of the base 5, and a means (not shown) for pumping water from the water trough 41 to the inlet in the tray 35. In use, the water trough 41 receives water from a main supply (not shown) and as runoff from the side wall panels 7.

The water distribution system is adapted to supply different flow rates of water to the side wall panels 7 to take into account the different sizes of the panels 7.

The evaporative air conditioner further includes a suspension system for supporting the housing 3 and other components of the air conditioner from the roof 11.

The suspension system includes:

(i) 4 support members 29 that are connected to the collar 19 and extend upwardly from the collar 19 to the upper corners of the housing 3; and (ii) 4 suspension arms 31 which are arranged so that one suspension arm 31 extends downwardly from each support member 29 and is connected at a lower end to the base 5.

In effect, the housing 3 and other components of the air conditioner are suspended via the above-described suspension system.

In order to further strengthen the support for the housing 3, the air conditioner further includes 4 brace members 33 that extend generally horizontally outwardly from the collar 19 and are connected to the lower ends of the suspension arms 31.

Each assembly of the support members 29, the suspension arms 31 and the brace members 33 define a triangular structure that is a particularly effective support for the air conditioner.

The air conditioner further includes an axial fan (not shown) positioned in the collar 19 and operable to draw air into the housing 3 through the side wall panels 7 and to force cooled air through the outlet opening 23, the collar 19, and the ductwork 25.

The air conditioner further includes water management and electronic control systems 51 for controlling the operation of the air conditioner located in a chamber 53 moulded in the base 5.

The above-described preferred embodiment of the air conditioner of the present invention operates efficiently and effectively.

Many modifications may be made to the preferred embodiment of the present invention without departing from the spirit and scope of the invention.

What is claimed is:

1. A pitched roof-mounted evaporative air conditioner, the air conditioner comprising:
   (a) a housing defined by:
      (i) a base which conforms to the pitch of the roof and includes an outlet for air to flow from the housing into ductwork;
      (ii) a plurality of vertical side walls, with at least one side wall including a water absorbent panel that defines an inlet for air to flow into the housing; and
      (iii) a generally horizontal top wall;
   (b) a water distribution system for supplying water to the panel(s); and
   (c) a fan assembly for drawing air into the housing via the panel(s) so that the air is cooled by evaporating water in the panel(s).

2. The air conditioner in claim 1 wherein the base is located on or a short distance only above the roof-line of the roof.

3. The air conditioner defined in claim 1 wherein the base includes a generally wave-like configuration when viewed in side elevation.

4. The air conditioner defined in claim 3 wherein the base includes a convex lower section, a concave middle section and a convex upper section when viewed in side elevation.

5. The air-conditioner defined in claim 4 includes a collar which is connected to the roof and defines a support for the housing and other components of the air conditioner and a transition between the outlet of the housing and the ductwork.

6. The air-conditioner defined in claim 1 includes a collar which is connected to the roof and defines a support for the housing and other components of the air conditioner and a transition between the outlet of the housing and the ductwork.

7. The air conditioner defined in claim 6 further includes a suspension system for suspending the housing and other components of the air conditioner in position above the roof-line.

8. The air conditioner defined in claim 6 further includes a suspension system for suspending the housing and other components of the air conditioner in position above the roof-line.

9. The air conditioner defined in claim 8 wherein the suspension system is mounted to the collar.

10. The air conditioner defined in claim 9 wherein the suspension system includes:
   (i) a support member extending upwardly from the collar to each upper corner section of the housing; and
   (ii) a suspension arm extending downwardly from the upper section of each corner and connected to the base.

11. The air conditioner defined in claim 10 further includes a brace member extending between the collar and the lower end of each suspension arm whereby the support members, the suspension arms, and the brace members to form a plurality of triangular support structures.

12. The air conditioner defined in claim 11 wherein said collar supports the housing and other components of the air conditioner which is adapted to be connected to the roof frame of the house and to define a transition between the outlet in the base and the ductwork.

13. An evaporative air conditioner for mounting to a pitched roof of a house, the air conditioner comprising:
   (a) a housing having a base which is adapted to conform to the pitch of the roof and a plurality of side walls adapted to extend vertically when the air conditioner is positioned on the roof, with at least one side wall including a water absorbent porous panel that defines an inlet for air to flow into the housing;
   (b) a water distribution system having:
      (i) a water trough formed in a lower section of the base;
      (ii) a water distribution tray positioned in an upper section of the housing for supplying water onto an upper edge of the panel(s); and
      (iii) a means for pumping water from the water trough to the water distribution tray; and
   (c) a fan for drawing into the housing via the side wall panel(s) and for discharging air from the housing via an outlet.

14. The air conditioner defined in claim 13 wherein the housing further includes a top wall that is adapted to extend horizontally when the air conditioner is positioned on the roof.

15. The air conditioner defined in claim 14 wherein the base includes a generally wave-like configuration when viewed in side elevation.

16. The air conditioner defined in claim 13 wherein the base includes a generally wave-like configuration when viewed in side elevation.

17. The air conditioner defined in claim 16 wherein the base includes a convex lower section, a concave middle section, and a convex upper section.

18. The air conditioner defined in claim 13 wherein the base includes an outlet for air to flow from the housing into ductwork.

19. The air conditioner defined in claim 13 further includes a collar for supporting the housing and other components of the air conditioner which is adapted to be connected to the roof frame of the house and to define a transition between the outlet in the base and the ductwork.

20. A pitched roof-mounted evaporative air conditioner, the air conditioner comprising:
   (a) a housing defined by:
      (i) a base which conforms to the pitch of the roof and is located on or a short distance only above the roof-line of the roof and includes an outlet for air to flow from the housing into ductwork;
      (ii) a plurality of vertical side walls, with at least one side wall including a water absorbent panel that defines an inlet for air to flow into the housing; and
      (iii) a top wall;
   (b) a water distribution system for supplying water to the panel(s); and
   (c) a fan assembly for drawing air into the housing via the panel(s) so that the air is cooled by evaporating water in the panel(s).

21. The air conditioner defined in claim 20, wherein the top wall of the housing is generally horizontal.

22. The air conditioner defined in claim 21, wherein the base includes a generally wave-like configuration when viewed in side elevation.

23. The air conditioner defined in claim 22, wherein the base includes a convex lower section, a concave middle section, and a concave upper section when viewed in side elevation.

24. The air conditioner defined in claim 20, wherein the base includes a generally wave-like configuration when viewed in side elevation.

25. The air conditioner defined in claim 24, wherein the base includes a convex lower section, a concave middle section, and a concave upper section when viewed in side elevation.

26. The air conditioner defined in claim 20, further comprising a collar which is connected to the roof and defined a support for the housing and other components of the air conditioner and a transition between the outlet of the housing and the ductwork.

27. The air conditioner defined in claim 20, further comprising a suspension system for suspending the housing and other components of the air conditioner in position above the roof-line.

28. The air conditioner defined in claim 27, wherein the suspension system is mounted to the collar.

29. The air conditioner defined in claim 28, wherein the suspension system includes:

(i) a support arm extending upwardly form the collar to each upper corner section of the housing; and (ii) a suspension member extending downwardly from the upper section of each corner and connected to the base.

30. The air conditioner defined in claim 29, further comprising a brace element extending between the collar and the lower end of each suspension arm whereby the support members, the suspension arms, and the brace members form a plurality of triangular support structures.

* * * * *